(12) United States Patent
Asakura et al.

(10) Patent No.: US 8,418,577 B2
(45) Date of Patent: Apr. 16, 2013

(54) BALL SCREW MECHANISM AND ELECTRIC POWER STEERING DEVICE USING THE SAME

(75) Inventors: Toshihiro Asakura, Chiryu (JP); Takashi Fuwa, Okazaki (JP)

(73) Assignee: JTEKT Corporation, Osaka-shi (JP)

( * ) Notice: Subject to any disclaimer, the term of this patent is extended or adjusted under 35 U.S.C. 154(b) by 411 days.

(21) Appl. No.: 12/418,908

(22) Filed: Apr. 6, 2009

(65) Prior Publication Data

US 2009/0255752 A1  Oct. 15, 2009

(30) Foreign Application Priority Data

Apr. 14, 2008  (JP) .................................. 2008-104515

(51) Int. Cl.
*F16H 1/24* (2006.01)

(52) U.S. Cl.
USPC ...................................................... 74/424.81

(58) Field of Classification Search ............... 74/424.81, 74/424.82, 424.83, 424.84, 424.85, 424.86, 74/424.87, 424.88, 424.89, 424.9; 384/51, 384/521, 523
See application file for complete search history.

(56) References Cited

U.S. PATENT DOCUMENTS

| | | | | |
|---|---|---|---|---|
| 463,834 A | * | 11/1891 | Howard | 384/534 |
| 2,214,493 A | * | 9/1940 | Trbojevich | 74/424.82 |
| 3,214,993 A | * | 11/1965 | Teramachi | 74/424.9 |
| 3,302,477 A | * | 2/1967 | Grabowski | 74/424.85 |
| 5,178,030 A | * | 1/1993 | Bousquet | 74/424.9 |
| 6,439,072 B1 | * | 8/2002 | Kajita et al. | 74/89.23 |
| 6,973,990 B2 | * | 12/2005 | Honaga et al. | 180/444 |

FOREIGN PATENT DOCUMENTS

| | | | |
|---|---|---|---|
| EP | 1 686 040 A1 | | 8/2006 |
| JP | 55-78849 | | 6/1980 |
| JP | 60-263764 | | 12/1985 |
| JP | 2-5145 | | 2/1990 |
| JP | 6-288458 | | 10/1994 |
| JP | 2003-97667 | | 4/2003 |
| JP | 2003120785 A | * | 4/2003 |
| JP | 2006070997 A | * | 3/2006 |
| JP | 2007-270984 | | 10/2007 |
| SU | 1597485 A1 | | 10/1990 |

OTHER PUBLICATIONS

Office Action issued Mar. 6, 2012 in Japanese Patent Application No. 2008-104515 (with English translation).

* cited by examiner

*Primary Examiner* — Thomas R Hannon
*Assistant Examiner* — Alan Waits
(74) *Attorney, Agent, or Firm* — Oblon, Spivak, McClelland, Maier & Neustadt, L.L.P.

(57) ABSTRACT

In a ball screw mechanism, a retainer is provided between an outer circumference of a ball screw shaft and an inner circumference of a ball nut and has a plurality of retainer grooves arranged in the circumferential direction for retaining a plurality of rolling balls. Each retainer groove of the retainer takes a form that allows the rolling balls therein to move radially outward but restrains the rolling balls therein from moving radially inward. Therefore, in the ball screw mechanism and an electric power steering device incorporating the same, the movement of the retainer in radial directions can be restricted by the plurality of rolling balls which are rolled along ball rolling grooves spirally formed respectively on the outer circumference of the ball screw shaft and the inner circumference of the ball nut.

6 Claims, 4 Drawing Sheets

FIG. 5(A)
PRIOR ART
FIG. 5(B)
PRIOR ART
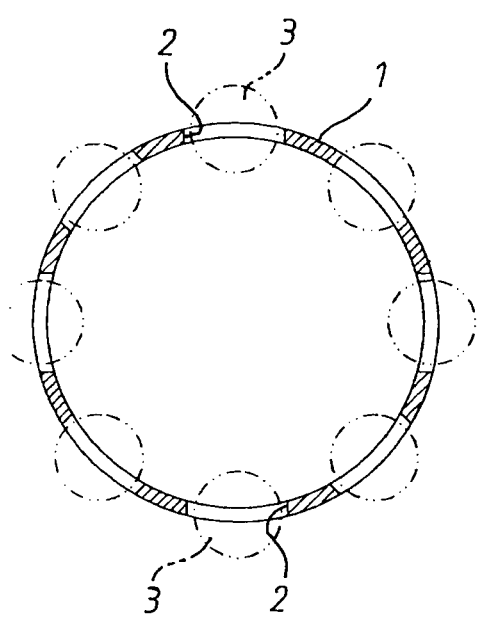
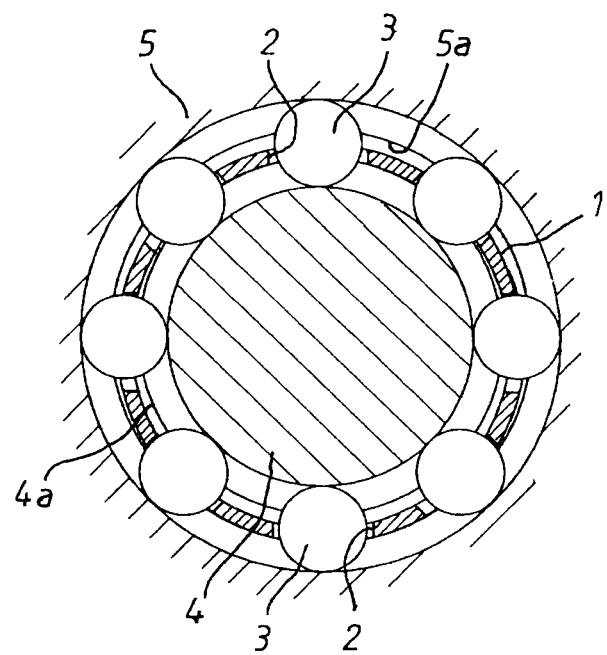

BALL SCREW MECHANISM AND ELECTRIC POWER STEERING DEVICE USING THE SAME

INCORPORATION BY REFERENCE

This application is based on and claims priority under 35 U.S.C. 119 with respect to Japanese Application No. 2008-104515 filed on Apr. 14, 2008, the entire content of which is incorporated herein by reference.

BACKGROUND OF THE INVENTION

1. Field of the Invention

The present invention relates to a ball screw mechanism with a retainer for retaining rolling balls and further to an electric power steering device using the ball screw mechanism.

2. Discussion of the Related Art

Generally, electric power steering devices are provided with an electric motor for assisting a manual steering torque applied to a steering wheel and a ball screw mechanism for converting the rotational motion of the electric motor into the axial motion of a rack shaft. Generally, the ball screw mechanism takes the construction that the rack shaft is provided bodily with a ball screw shaft, that a ball nut is attached to a motor shaft driven by the electric motor, and that the ball screw shaft and the ball nut are screw-engaged through a plurality of rolling balls.

In the electric power steering device of this kind, with rotation of the ball nut, the plurality of rolling balls are rolled spirally (i.e., along the way of screw grooves) between the ball screw shaft and the ball nut in the same direction as they are rotated. Generally, since the rolling balls are arranged closely between the ball screw shaft and the ball nut, rolling motions of the rolling balls bring adjoining rolling balls into collision, at which time, the rotational directions at their contact portions of the adjoining rolling balls become opposite. As a result, there is generated a sliding resistance between the adjoining rolling balls, and the sliding resistance could cause the rotational torque generated by the ball screw mechanism to fluctuate, whereby it is feared that the fluctuation of the rotational torque adversely influences the steering feeling.

In order to solve the aforementioned problem, there has been proposed a ball screw mechanism, in which, as described for example in Japanese examined, published Utility Model Application No. 2-5145, a retainer with elongate holes (retainer grooves) for retaining a plurality of rolling balls to be rollable is arranged between a ball screw shaft and a ball nut. According to the ball screw mechanism described in the utility model application, since the retainer prevents adjoining balls from coming into contact with each other, the fluctuation in rotational torque caused by the aforementioned sliding resistance can be obviated.

However, in the known ball screw mechanism using such a retainer as described in the utility model application, as shown in FIG. 5(A), the groove width of the retainer grooves 2 are formed to be somewhat larger than the diameter of the rolling balls 3 to retain the rolling balls 3 to be rollable, so that each rolling ball 3 is retained in the retainer groove 2 with a play. Thus, as shown in FIG. 5(B), the retainer 1 arranged between the outer circumference 4a of the ball screw shaft 4 and the inner circumference 5a of the ball nut 5 radially deviates (falls) by its dead weight due to the play (clearance) between the retainer grooves 2 and the rolling balls 3. This causes the retainer 1 to come into contact partly with the outer circumference 4a of the ball screw shaft 4 or with the inner circumference 5a of the ball nut 5. Therefore, it is feared that a rubbing noise is generated or that the contact causes abrasion to occur. In order to obviate the foregoing problem, it is required to make larger the radial space between the outer circumference 4a of the ball screw shaft 4 and the inner circumference 5a of the ball nut 5.

SUMMARY OF THE INVENTION

Accordingly, it is a primary object of the present invention to provide an improved ball screw mechanism capable of restricting the falling amount of a retainer arranged between a ball screw shaft and a ball nut and also to provide an improved electric power steering device using the mechanism.

Briefly, according to the present invention, there is provided an improved ball screw mechanism, which comprises a ball screw shaft with a ball rolling groove formed spirally on an outer circumferential surface thereof; a ball nut with a ball rolling groove formed spirally on an inner circumferential surface thereof; a plurality of rolling balls circulatably arranged between the respective ball rolling grooves of the ball screw shaft and the ball nut; and a retainer provided between the outer circumference of the ball screw shaft and the inner circumference of the ball nut and having a plurality of retainer grooves arranged in the circumferential direction for retaining the rolling balls. Each of the retainer grooves of the retainer takes a form that allows the rolling balls therein to move radially outward but restrains the rolling bolls therein from moving radially inward.

With the aforementioned construction, since each of the retainer grooves of the retainer takes a form that allows the rolling balls therein to move radially outward but restrains the rolling bolls therein from moving radially inward, the retainer is restrained from moving radially outward relative to the respective rolling balls which are retained in the plurality of retainer grooves arranged in the circumferential direction. As a result, even where the radial space between the outer circumference of the balls screw shaft and the inner circumference of the ball nut is narrow, the retainer can reliably be prevented from coming into contact with either of the ball screw shaft and the ball nut when deviated in radial directions. Therefore, it can be realized to preclude the generation of noises caused by the contact of the retainer with either of the ball screw shaft and the ball nut. In addition, since the rolling balls are allowed to move radially outward, they can be returned for circulation by going over the outer circumference of the ball screw shaft, so that it becomes possible to use a deflector-type ball circulation mechanism like that used in the prior art mechanism.

BRIEF DESCRIPTION OF THE ACCOMPANYING DRAWINGS

The foregoing and other objects and many of the attendant advantages of the present invention may readily be appreciated as the same becomes better understood by reference to the preferred embodiment of the present invention when considered in connection with the accompanying drawings, wherein like reference numerals designate the same or corresponding parts throughout several views, and in which:

FIGS. 5(A) and 5(B) are cross-sectional views each showing a retainer of a ball screw mechanism in the prior art.

DETAILED DESCRIPTION OF THE PREFERRED EMBODIMENT

Figure 1:
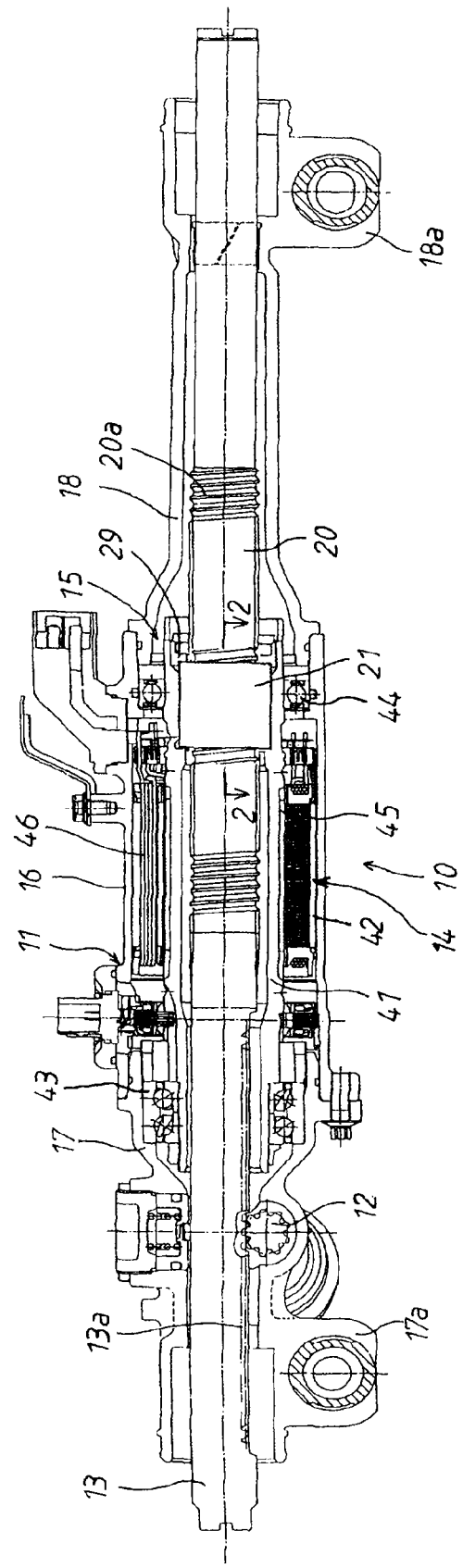
FIG. 1 is a longitudinal sectional view of an electric power steering device using a ball screw mechanism in an embodiment according to the present invention.

Hereafter, an embodiment according to the present invention will be described with reference to the accompanying drawings. FIG. 1 shows the entire configuration of an electric power steering device 10 incorporating a ball screw mechanism 15 in the present embodiment. The electric power steering device 10 is provided with a housing 11 which is arranged to extend in the left-right direction of a vehicle (not shown). In the housing 11, there are provided a pinion shaft 12 rotatable by a steering wheel (not shown), a rack shaft 13 on which rack teeth 13a are formed to mesh with the pinion shaft 12, an electric motor 14 arranged in co-axial alignment with the rack shaft 13, the ball screw mechanism 15 for converting the rotational motion of the electric motor 14 into the axial motion of the rack shaft 13, and the like.

The housing 11 is composed of a cylindrical motor housing 16 and hollow rack housings 17, 18 which are coaxially fitted respectively in opposite end openings of the motor housing 16. The housing 11 is supported by a vehicle body (not shown) through mounting portions 17a, 18a formed respectively on the rack housings 17, 18.

The rack shaft 13 passes through the housing 11 to be slidable in the axial direction and is connected at its opposite ends with left and right steerable wheels (e.g. left and right front wheels of the vehicle) through tie rods, knuckle arms and the like (all not shown). Thus, the steerable wheels can be steered toward left or right by the axial movement of the rack shaft 13.

Figure 2:
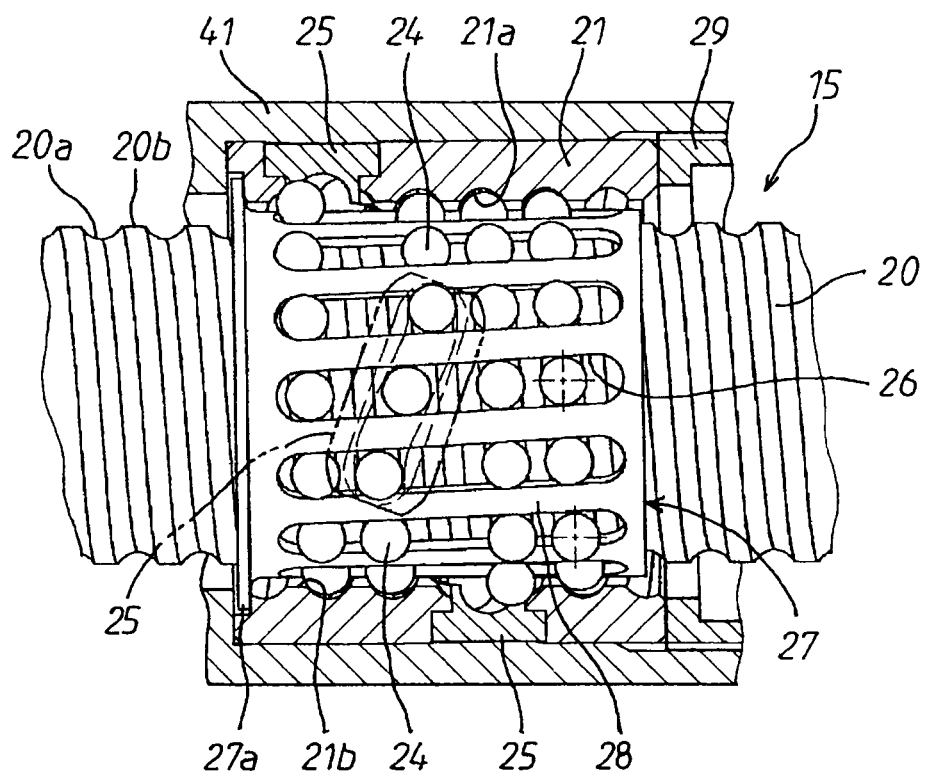
FIG. 2 is an enlarged fragmentary longitudinal sectional view, taken along the line 2-2 in FIG. 1, of the ball screw mechanism with a retainer.

A ball screw shaft 20 constituting the ball screw mechanism 15 is provided as a portion of the rack shaft 13. As shown in FIG. 2 in detail, the ball screw mechanism 15 is composed of the ball screw shaft 20 having a ball rolling groove 20a formed spirally on the outer circumferential surface thereof, a ball nut 21 having a ball rolling groove 21a formed spirally on the inner circumferential surface thereof, and a plurality of rolling balls 24 rollable in and along a ball track formed between the ball rolling groove 20a of the ball screw shaft 20 and the ball rolling groove 21a of the ball nut 21. The ball screw mechanism 15 is further composed of a plurality of deflectors 25 arranged in the circumferential direction for returning the rolling balls 24 between two adjoining ball rolling grooves 20a, 21a and a thin annular or cylindrical retainer 27 arranged between the outer circumference 20b of the ball screw shaft 20 and the inner circumference 21b of the ball nut 21 and having a plurality of retainer grooves 26 arranged in the circumferential direction for retaining the rolling balls 24.

The ball nut 21 is fitted in a motor shaft 41 which constitutes a rotor of the electric motor 14 referred to later and is secured to the motor shaft 41 by being axially fastened by a fastening nut 29. With this, when the ball nut 21 is rotated by the motor shaft 41 in a positive or negative-going direction, the rack shaft 13 can be reciprocally moved together with the ball screw shaft 20 in the axial direction.

Figure 3:
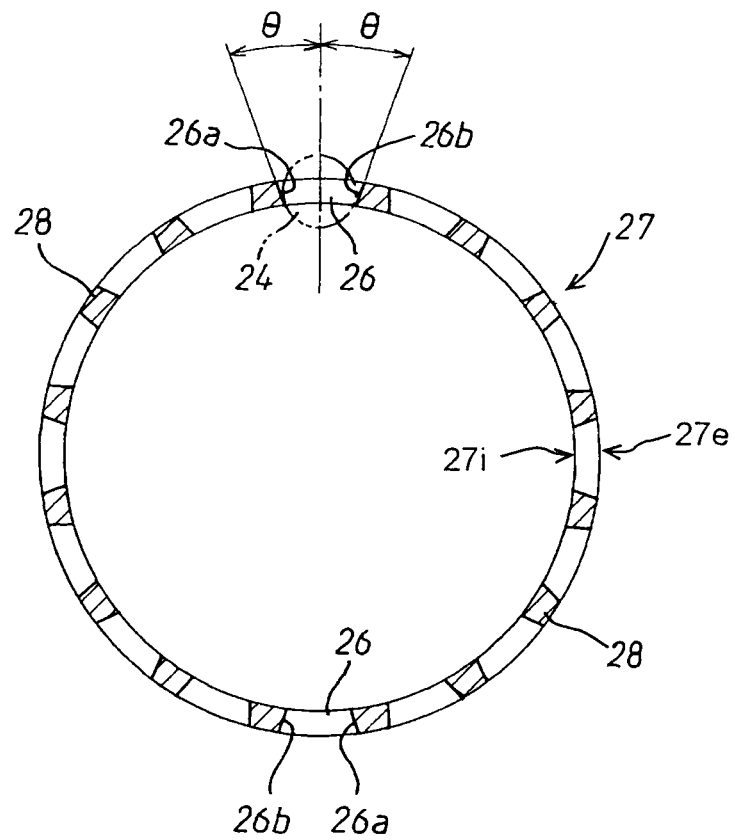
FIG. 3 is an enlarged cross-sectional view of the retainer.

As shown in FIGS. 2 and 3, the retainer 27 has the plurality of retainer grooves 26, which extend in the axial direction of the ball screw shaft 20 and each of which takes the form of an elongate hole, at equiangular intervals in the circumferential direction. Each separating portion 28 which separates adjoining retainer grooves 26 in the circumferential direction is made to be sufficiently narrower in the width size in the circumferential direction than the diametrical size of the rolling balls 24, so that the rolling balls 24 (the retainer grooves 26) of the number enough to meet the load capacity of the ball screw mechanism 15 can be arranged on the circumference of the retainer 27. The retainer grooves 26 (to be more exact, the centerlines thereof) are inclined a predetermined angle relative to the axis of the ball screw shaft 20 each to extend in a direction perpendicular to those portions in radial alignment with each retainer groove 26 of the respective ball rolling grooves 20a, 21a of the ball screw shaft 20 and the ball nut 21. In other words, the retainer grooves 26 are inclined by the lead angle of the ball rolling grooves 20a, 21a with respect to the axis of the ball screw shaft 20 and thus, are formed to extend at right angles relative to the ball rolling grooves 20a, 21a.

Figure 4:
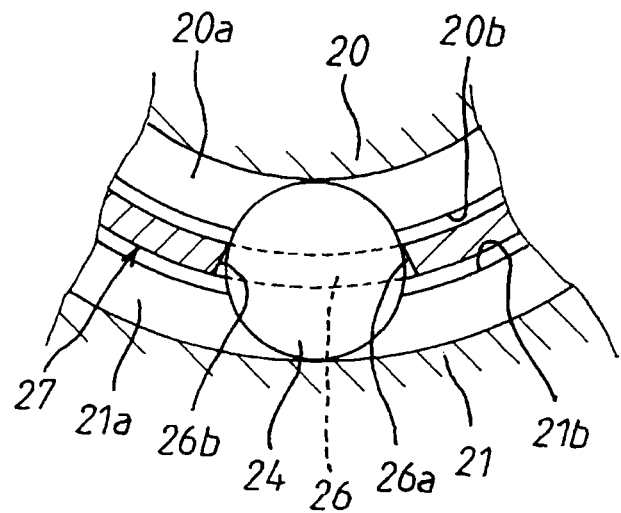
FIG. 4 is an enlarged fragmentary cross-sectional view showing the contact state of the retainer with a rolling ball.

Both end portions in the circumferential direction of each retainer groove 26 are formed as oblique surfaces 26a, 26b which are inclined a predetermined angle (θ) relative to an imaginary plane (not shown) including the axis of the retainer 27 and crossing the center of the width in the circumferential direction, so that the both end portions in the circumferential direction of each retainer groove 26 become wider in width as they go in the radially outward direction. That is, as shown in FIG. 3, the cross-sectional shape of each retainer groove 26 has the oblique surfaces 26a, 26b which take the form of the oblique sides of an inverted isosceles trapezoid. Further, by being tapered toward the axis of the retainer 27 to form the oblique surfaces 26a, 26b, the width in the circumferential direction of each retainer groove 26 is set to be narrower at the inner circumference 27i than the diametrical size of the rolling balls 24 and to be wider at the outer circumference 27e than the diametrical size of the rolling balls 24. With this configuration, each rolling ball 24 is allowed to move in the radially outward direction from a radially innermost position at which it contacts radially inner edge portions of the oblique surfaces 26a, 26b, but is restrained from moving in the radially inward direction beyond the radially innermost position. As a result, as shown in FIG. 4, the oblique surfaces 26a, 26b of a retainer groove 26 located at the lowermost position come into contact with the rolling balls 24 which roll between the ball screw shaft 20 and the ball nut 21, whereby the retainer 27 is restrained from moving in the radial direction (in the downward direction). This advantageously prevents the retainer 27 from contacting either of the outer circumference 20b of the ball screw shaft 20 and the inner circumference 21b of the ball nut 21.

When each rolling ball 24 is caused by an associated one of the deflector 25 to go up on the outer circumference 20b of the ball screw shaft 20 and to be returned, it is separated by an associated one of the separating portions 28 not to contact an adjoining rolling ball 24. Therefore, each rolling ball 24 can go through the associated deflector 25 as it is pushed by the retainer 27, so that the rolling balls 24 can be returned smoothly.

As shown in FIG. 2, the retainer 27 is provided at its axial one end with a flange portion 27a contactable with an end surface of the ball nut 21, and as a result of fitting the ball nut 21 into the motor shaft 41, the flange portion 27a is sandwiched between a stepped end surface of the motor shaft 41 and the end surface of the ball nut 21 and is restrained from moving in the axial direction.

The aforementioned ball screw shaft 20, ball nut 21, rolling balls 24, deflectors 25, retainer 27 and the like constitute the ball screw mechanism 15 for converting the rotational motion of the motor shaft 41 into the axial motion of the rack shaft 13.

The electric motor 14 is for applying an axial assist force to the ball screw shaft 20 (the rack shaft 13) through the ball screw mechanism 15 and is composed of the motor shaft 41 being the hollow rotor and a stator 42, as shown in FIG. 1. The motor shaft 41 is rotatably supported in the housing 11 (composed of the motor housing 16 and the rack housings 17, 18) through antifriction bearings 43, 44. The ball screw shaft 20 coaxially passes through a hollow hole of the motor shaft 41. A plurality of permanent magnets 45 each taking the shape of a flat plate are adhered to the outer circumference of the motor shaft 41, while the stator 42 is securely fitted in the internal surface of the motor housing 16 to face the permanent magnets 45. The stator 42 is provided with a plurality of coils 46. When the coils 46 are electrified, magnetic flux is generated to act on the permanent magnets 45, whereby the motor shaft 41 is rotated.

Next, description will be made regarding the operation of the electric power steering device 10 constructed as described above. When the steering wheel (not shown) is steered, a steering torque is transmitted to an input shaft (not shown), and the rack shaft 13 is moved in the axial direction through a rack-and-pinion mechanism composed of the pinion shaft 12 and the rack shaft 13.

The steering torque exerted on the input shaft is detected by a torque sensor (not shown), and the rotational position of the motor shaft 41 of the electric motor 14 is detected by a rotational angle detection sensor (not shown). The electric motor 14 is controlled based on the steering torque, the rotational position of the motor shaft 41 and the like to generate an assist force. The assist force generated by the electric motor 14 is converted by the ball screw mechanism 15 into the axial movement of the rack shaft 13, whereby the steering force to be applied by the driver to the steering wheel is reduced.

In the power assist operation, when the ball nut 21, together with the motor shaft 41, is rotated by the electric motor 14, the plurality of rolling balls 24 are rolled in the circumferential direction between the ball screw shaft 20 and the ball nut 21 as they are rotated in the same direction. Adjoining rolling balls 24 are separated by the separating portion 28 therebetween of the retainer 27 in the circumferential direction and are moved in the circumferential direction as they are pushed or propelled by the separating portions 28 which are behind in the rotational direction. Therefore, the rolling balls 24 can be prevented from coming into collision between those adjoining and from dwelling or remaining without being rolled, so that the ball screw mechanism 15 can be operated smoothly. This further advantageously results not only in preventing the fluctuation in rotational torque but also in reducing the operation noise.

As mentioned earlier, the both end portions in the circumferential direction of each retainer groove 26 of the retainer 27 are formed as the oblique surfaces 26a, 26b for restraining the rolling balls 24 in that retainer groove 26 from moving radially inward. Thus, the retainer 27 is restrained from moving radially outward through the contacts with the plurality of rolling balls 24 which are retained in the plurality of retainer grooves 26 arranged in the circumferential direction. Therefore, the retainer 27 can be prevented from falling by its dead weight due to the looseness or play between each retainer groove 26 and the rolling balls 24 retained therein and hence, from coming into contact with either of the outer circumference 20b of the ball screw shaft 20 and the inner circumference 21b of the ball nut 21. As a consequence, even where the annular space between the outer circumference 20b of the ball screw shaft 20 and the inner circumference 21b of the ball nut 21 is taken to be narrow, it can be prevented that by being moved in radial directions, the retainer 27 comes into contact with either of the balls screw shaft 20 and the ball nut 21 to rub or scrape each other. Accordingly, it becomes possible to prevent the generation of noises caused by the contact of the retainer 27 with the ball screw shaft 20 or with the ball nut 21.

Further, according to the present embodiment, because the rolling balls 24 retained in each retainer groove 26 are restrained from moving radially inside of the retainer 27 through that retainer groove 26, it does not occur that the rolling balls 24 fall into the inner circumferential side of the retainer 27 when interposed between the ball nut 21 and the retainer 27. Thus, when, with the retainer 27 inserted loosely into the internal surface of the ball nut 21, the rolling balls 24 are supplied from attaching holes, which open on the outer circumference of the ball nut 21 to have the deflectors 25 respectively fitted therein, while the retainer 27 is being rotated, the rolling balls 24 are inserted one by one into each of the retainer grooves 26 of the retainer 27, whereby the ball nut 21 and the retainer 27 can be assembled by the agency of the rolling balls 24. In this manner, a subassembly of the ball nut 21 and the retainer 27 can be constructed prior to assembling the ball nut 21 on the ball screw shaft 20, and then by assembling the subassembly on the ball screw shaft 20, it becomes possible to construct the ball screw mechanism 15. By making the subassembly like this, the inserting work of the rolling balls 24 can be done easily.

Further, as mentioned earlier, each retainer groove 26 is inclined relative to the axis of the ball screw shaft 20 to extend at right angles with the ball rolling grooves 20a, 21a of the ball screw shaft 20 and the ball nut 21. Thus, it does not occur that when being rolled, the rolling balls 24 are slidden on the oblique surfaces 26a, 26b of each retainer groove 26 in the axial direction of the ball screw shaft 20. This advantageously results in precluding the generation of noises caused by the sliding movement.

However, it is to be noted that inclining the retainer grooves 26 relative to the axis of the ball screw shaft 20 to make each retainer groove 26 orthogonal to the portions at the same angular phase of the ball rolling grooves 20a, 21a is not necessarily a requirement essential to the present invention. Instead, the present invention is also applicable to a ball screw mechanism 15 which is modified so that the retainer grooves 26 are formed to extend in parallel to the axis of the ball screw shaft 20.

As described above, according to the ball screw mechanism 15 in the present embodiment, by the provision of the retainer 27 for retaining the rolling balls 24, it does not occur that adjoining rolling balls 24 contact each other. Thus, it can be realized to prevent the rotational torque from being fluctuated by the contact between adjoining rolling balls 24.

Further, since each retainer groove 26 of the retainer 27 is configured so that the rolling balls 24 therein are allowed to move radially outward but are restrained from moving radially inside of the retainer 27, an adverse affection does not act on the deflectors 25 in circulating the rolling balls 24, and the retainer 27 can be restrained from moving radially outward relative to the respective rolling balls 24 which are retained in the plurality of retainer grooves 26 arranged circumferentially. In addition, each retainer groove 26 takes the form of the oblique sides of an inverted isosceles trapezoid in cross-section, it can be accomplished in a very simplified construction to restrain the rolling balls 24 from moving radially inside of the retainer 27.

As a consequence, the movement of the retainer 27 in the direction of gravity can be restricted by the rolling balls 24 which roll at the position under the ball screw shaft 20. Thus, even where the radial spaces are narrow between the retainer 27 and the outer circumference 20b of the ball screw shaft 20 and between the retainer 27 and the inner circumference 21b of the ball nut 21, it can be accomplished reliably to prevent the retainer 27 from coming into contact with either of the ball screw shaft 20 and the ball nut 21.

Further, according to the electric power steering device 10 using the ball screw mechanism 15 of the aforementioned construction, the retainer 27 precludes the contact between adjoining rolling balls 24, and this prevents the fluctuation in rotational torque, so that the steering feeling of the electric power steering device 10 can be improved. Moreover, because the retainer 27 can be prevented from coming into contact with either of the ball screw shaft 20 and the ball nut 21, it becomes possible to realize an electric power steering device which is excellent in a hushed quality.

Although in the foregoing embodiment, description has been made regarding the example that the ball screw mechanism 15 is applied to the electric power steering device 10, the present invention is also applicable to ball screw mechanisms used in, for example, machine tools or the like.

Various features and many of the attendant advantages in the foregoing embodiment will be summarized as follows:

In the ball screw mechanism 15 in the embodiment typically shown in FIGS. 3 and 4, each of the retainer grooves 26 of the retainer 27 takes a form that allows the rolling balls 24 therein to move radially outward but restrains the rolling bolls 24 therein from moving radially inward, the retainer 27 is restrained from moving radially outward relative to the respective rolling balls 24 which are retained in the plurality of retainer grooves 26 arranged in the circumferential direction. As a result, even where the radial space between the outer circumference 20b of the balls screw shaft 20 and the inner circumference 21b of the ball nut 21 is narrow, the retainer 27 can reliably be prevented from coming into contact with either of the ball screw shaft 20 and the ball nut 21 when deviated in radial directions. Therefore, it can be realized to preclude the generation of noises caused by the contact of the retainer 27 with either of the ball screw shaft 20 and the ball nut 21. In addition, since the rolling balls 24 are allowed to move radially outward, they can be returned by going over the outer circumference 20b of the ball screw shaft 20, so that it becomes possible to use a deflector-type ball circulation mechanism like that used in the prior art mechanism.

Also in the ball screw mechanism 15 in the embodiment typically shown in FIGS. 3 and 4, since each of the retainer grooves 26 is tapered radially inward (i.e., toward the axis of the retainer 27) so that the rolling balls 24 therein do not go toward the inside of the retainer 27 through the radially inner edge portions of each retainer groove 26, it can be accomplished in a simplified construction to restrain the rolling balls 24 from moving radially inward.

Also in the ball screw mechanism 15 in the embodiment typically shown in FIGS. 3 and 4, since each of the retainer grooves 26 has the oblique surfaces 26a, 26b at both end portions in the circumferential direction and takes the form of oblique sides of an inverted isosceles trapezoid in cross-section, it can be accomplished in a simplified construction to restrain the rolling balls 24 from moving radially inward.

Also in the ball screw mechanism 15 in the embodiment typically shown in FIG. 2, since the ball nut 21 and the retainer 27 are configured to be integrated as a subassembly by the agency of the rolling balls 24 prior to being assembled on the ball screw shaft 20, the work for inserting the rolling balls 24 into the ball rolling groove 21a of the ball nut 21 becomes possible to do prior to assembling the ball nut 21 on the ball screw shaft 20, so that the ball inserting work can be done easily.

Also in the ball screw mechanism 15 in the embodiment typically shown in FIG. 2, since each of the retainer grooves 26 is inclined relative to the axis of the balls screw shaft 20 to extend at right angles with portions at the same angular phase of the ball rolling grooves 20a, 21a, it does not occur that when being rolled, the rolling balls 24 are slidden on each retainer groove 26 in the axial direction of the ball screw shaft 20. This advantageously results in precluding the generation of noises caused by the sliding movement.

In the electric power steering device 10 in the present embodiment typically shown in FIG. 1, since the ball screw mechanism 15 of the character set forth above is incorporated, the retainer 27 precludes the contact between adjoining rolling balls 24, and this prevents the fluctuation in rotational torque, so that the steering feeling of the electric power steering device 10 can be improved. Moreover, because the retainer 27 can be prevented from coming into contact with either of the ball screw shaft 20 and the ball nut 21, it becomes possible to realize the electric power steering device 10 which is excellent in a hushed quality.

Obviously, further numerous modifications and variations of the present invention are possible in light of the above teachings. It is therefore to be understood that within the scope of the appended claims, the present invention may be practiced otherwise than as specifically described herein.

What is claimed is:

1. A ball screw mechanism comprising:
   a ball screw shaft with a ball rolling groove formed spirally on an outer circumferential surface thereof;
   a ball nut with a ball rolling groove formed spirally on an inner circumferential surface thereof;
   a plurality of rolling balls circulatably arranged between the respective ball rolling groove of the ball screw shaft and the ball nut, wherein the balls are able to roll in the direction of a length of the ball rolling groove; and
   a retainer provided between the outer circumference of the ball screw shaft and the inner circumference of the ball nut and having a plurality of retainer grooves arranged in the circumferential direction for retaining the rolling balls;
   wherein each of the retainer grooves of the retainer takes a form whereby the width, in the circumferential direction, of a radially inner portion of a respective retainer groove is smaller than the diameter of the rolling balls and the width, in the circumferential direction, of a radially outer portion of the respective retainer groove is greater than the diameter of the rolling balls, whereby the rolling balls are able to move radially outward but are restrained from moving radially inward, and
   wherein each of the retainer grooves is inclined relative to the axis of the balls screw shaft to extend at right angles to the length of the ball rolling groove, over a distance at least equal to the spacing between the turns of the spiral ball rolling groove, from the groove centers thereof, at portions of the ball rolling groove at the same circumferential angular position as the respective retainer grooves.

2. The ball screw mechanism as set forth in claim 1, wherein each of the retainer grooves is tapered radially inward so that the rolling balls therein do not go toward the inside of the retainer through radially inner edge portions of the retainer.

3. The ball screw mechanism as set forth in claim 1, wherein each of the retainer grooves has oblique surfaces at both end portions in the circumferential direction and takes the form of oblique sides of an inverted isosceles trapezoid in cross-section.

4. The ball screw mechanism as set forth in claim 1, wherein the ball nut and the retainer are configured to be integrated as a subassembly, by the rolling balls, prior to being assembled on the ball screw shaft.

5. An electric power steering device using the ball screw mechanism as set forth in claim 1.

6. An electric power steering device using the ball screw mechanism as set forth in claim 3.

* * * * *